US012129454B2

(12) United States Patent
Tan et al.

(10) Patent No.: US 12,129,454 B2
(45) **Date of Patent: *Oct. 29, 2024**

(54) LAUNDRY DETERGENT SHEET WITH MICROCAPSULES

(71) Applicant: The Procter & Gamble Company, Cincinnati, OH (US)

(72) Inventors: Hongsing Tan, Beijing (CN); Ming Tang, Beijing (CN); Mark Robert Sivik, Mason, OH (US); Frank William Denome, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,572

(22) Filed: May 8, 2023

(65) Prior Publication Data

US 2023/0272312 A1 Aug. 31, 2023

Related U.S. Application Data

(60) Continuation of application No. 17/077,345, filed on Oct. 22, 2020, now Pat. No. 11,680,232, which is a division of application No. 15/888,115, filed on Feb. 5, 2018, now abandoned.

(30) Foreign Application Priority Data

Feb. 6, 2017 (WO) ................ PCT/CN2017/072927

(51) Int. Cl.

| | |
|---|---|
| ***C11D 11/00*** | (2006.01) |
| ***C11D 1/37*** | (2006.01) |
| ***C11D 1/83*** | (2006.01) |
| ***C11D 3/22*** | (2006.01) |
| ***C11D 3/37*** | (2006.01) |
| ***C11D 3/50*** | (2006.01) |
| ***C11D 17/00*** | (2006.01) |
| ***C11D 17/04*** | (2006.01) |
| ***C11D 17/06*** | (2006.01) |
| *C11D 1/14* | (2006.01) |
| *C11D 1/22* | (2006.01) |
| *C11D 1/24* | (2006.01) |
| *C11D 1/72* | (2006.01) |

(52) U.S. Cl.

CPC ................ *C11D 3/505* (2013.01); *C11D 1/37* (2013.01); *C11D 1/83* (2013.01); *C11D 3/222* (2013.01); *C11D 3/3707* (2013.01); *C11D 3/3753* (2013.01); *C11D 11/0082* (2013.01); *C11D 17/0039* (2013.01); *C11D 17/044* (2013.01); *C11D 17/06* (2013.01); *C11D 1/146* (2013.01); *C11D 1/22* (2013.01); *C11D 1/24* (2013.01); *C11D 1/72* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 6,465,407 | B2 | 10/2002 | Hayashi |
| 6,677,296 | B2 | 1/2004 | Bonsall |
| 6,818,606 | B1 | 11/2004 | Hanada et al. |
| 7,094,744 | B1 | 8/2006 | Kobayashi et al. |
| 7,659,239 | B2 | 2/2010 | King et al. |
| 9,179,814 | B2 | 11/2015 | Tekulve et al. |
| 9,186,642 | B2 | 11/2015 | Dihora |
| 9,827,173 | B2 | 11/2017 | Lynch et al. |
| 9,994,801 | B2 | 6/2018 | Denutte |
| 11,680,232 | B2 | 6/2023 | Tan et al. |
| 2004/0152617 | A1 | 8/2004 | Murphy et al. |
| 2005/0118237 | A1 | 6/2005 | Krzysik et al. |
| 2006/0128594 | A1 | 6/2006 | Yates et al. |
| 2007/0269651 | A1 | 11/2007 | Denome et al. |
| 2008/0014393 | A1 * | 1/2008 | Denome ................ A61L 9/042 428/35.7 |
| 2008/0131695 | A1 | 6/2008 | Aouad et al. |
| 2009/0226529 | A1 | 9/2009 | Quellet et al. |
| 2010/0239622 | A1 | 9/2010 | Icht et al. |
| 2010/0294153 | A1 | 11/2010 | Content et al. |
| 2011/0028374 | A1 | 2/2011 | Fossum et al. |
| 2011/0039985 | A1 | 2/2011 | Patel et al. |
| 2011/0111999 | A1 | 5/2011 | Smets |
| 2011/0136719 | A1 | 6/2011 | Jalbert et al. |
| 2012/0239622 | A1 | 9/2012 | Elron et al. |
| 2012/0296603 | A1 | 11/2012 | Kulik et al. |

(Continued)

FOREIGN PATENT DOCUMENTS

| | | |
|---|---|---|
| CN | 105199887 | 12/2015 |
| CN | 105796375 A | 7/2016 |

(Continued)

OTHER PUBLICATIONS

Supplementary Extended EP Search Report and Search Opinion for 17895413.7 dated Sep. 28, 2020; 07 pages.
PCT Search Report and Written Opinion for PCT/CN2017/072927 dated Nov. 10, 2017, 8 pages.
PCT Supplementary Search Report and Written Opinion for PCT/CN2017/072927 dated Oct. 4, 2018, 6 pages.
All Office Actions; U.S. Appl. No. 15/888,115, filed Feb. 5, 2018.
All Office Actions; U.S. Appl. No. 17/077,345, filed Oct. 22, 2020.

*Primary Examiner* — Lorna M Douyon
(74) *Attorney, Agent, or Firm* — Carrie Schwartz; George H. Leal

(57) ABSTRACT

A method of making a non-fibrous laundry detergent sheet can include dispensing a microcapsule onto a precursor non-fibrous laundry detergent sheet, wherein the precursor non-fibrous laundry detergent sheet can include: (a) at least one surfactant; (b) at least one film former; and (c) a thickness ranging from 0.1 mm to 10 mm.

19 Claims, 3 Drawing Sheets

(56) References Cited

U.S. PATENT DOCUMENTS

| | | | |
|---|---|---|---|
| 2013/0269137 | A1 | 10/2013 | Tekulve et al. |
| 2013/0296211 | A1 | 11/2013 | Smets |
| 2014/0024103 | A1 | 1/2014 | Benie et al. |
| 2014/0315772 | A1 | 10/2014 | Cunningham |
| 2015/0159330 | A1 | 6/2015 | Weisman et al. |
| 2015/0218497 | A1 | 8/2015 | Jalbert et al. |
| 2015/0267144 | A1 | 9/2015 | Brain et al. |
| 2016/0362641 | A1 | 12/2016 | Souter et al. |
| 2017/0234618 | A1 | 8/2017 | Guo |
| 2018/0223225 | A1 | 8/2018 | Tan et al. |
| 2018/0360706 | A1 | 12/2018 | Dihora |
| 2020/0299473 | A1 | 9/2020 | Lee et al. |

FOREIGN PATENT DOCUMENTS

| | | | |
|---|---|---|---|
| CN | 205398584 | | 7/2016 |
| CN | 205856432 | U | 1/2017 |
| DE | 19955240 | | 5/2001 |
| EP | 0957158 | A1 | 11/1999 |
| JP | 2000169896 | | 6/2000 |
| JP | 2001294899 | A | 10/2001 |
| JP | 2005179430 | | 7/2005 |
| KR | 20120130693 | | 12/2012 |
| WO | 2009047124 | | 4/2009 |
| WO | 2010015493 | A1 | 2/2010 |
| WO | 2012158751 | A1 | 11/2012 |
| WO | 2012157851 | A9 | 4/2013 |
| WO | 2015193488 | A1 | 12/2015 |

* cited by examiner

LAUNDRY DETERGENT SHEET WITH MICROCAPSULES

FIELD OF THE INVENTION

The present invention is directed to non-fibrous laundry detergent sheets having microcapsules that can help clean laundry and impart freshness to the laundry.

BACKGROUND OF THE INVENTION

Consumers are continually expressing the desire to have scents on their fabrics that lasts longer & throughout the entire day. Non-fibrous laundry sheets are suitable for cleaning fabrics, but currently marketed sheets fall short in fulfilling this consumer need. With the growing & evolving scent trends in today's market place, especially in candles & the air care category, consumers want volatile scent characters such as fruity, citrus, green, lighter florals, and the like on their fabrics. The issue is that the perfume ingredients that are needed to produce these character types do not readily deposit onto clothing during laundering (i.e., fabric cleaning) or because they can be lost during the drying process given, inter alia, high temperatures.

Non-fibrous laundry sheets are a convenient vehicle for delivering freshness (via perfume) onto consumers' clothing. Long-lasting freshness (e.g., scent that lasts for several days) is particularly appealing to many consumer, and as a result of this, numerous ways to encapsulate perfume so as to increase its ability to last on clothing have been described. One suitable way includes the use of friable perfume microcapsules. However, a problem with friable perfume microcapsule, verses moisture activated microcapsules (e.g., cyclodextrin), is that traditional manufacturing approaches of making non-fibrous laundry sheets likely lead to premature rupturing of the microcapsule thereby providing unacceptable yields in the manufacture of these sheets. There is a need to identify a non-fibrous laundry sheets having such friable microcapsules, and manufacturing processes suitable to incorporate friable microcapsules into such sheets.

SUMMARY OF THE INVENTION

The present invention is based on the surprising discovery that friable microcapsules can be more effectively incorporated into non-fibrous laundry detergent sheets after the sheet is formed during the manufacturing process. In other words by dispensing the friable microcapsules to the sheet later in the manufacturing process, as opposed to being incorporating in the original starting materials, a better yield of friable microcapsules can be obtain in the final product.

One advantage of the present invention is better incorporation of perfume into onto the non-fibrous laundry detergent sheets by use of friable perfume microcapsules.

Another advantage is improving a user's experience when wearing clothing laundered by the non-fibrous laundry detergent sheets containing friable perfume microcapsules by the user smelling desirable volatile scent characters.

Yet still another advantage is improving a user's experience when wearing clothing laundered by the non-fibrous laundry detergent sheets containing friable perfume microcapsules by the user having long-lasting freshness imparted to their clothing.

Yet still another advantage is improving a user's experience when wearing clothing laundered by the non-fibrous laundry detergent sheets containing friable perfume microcapsules by the user experience a pleasant burst of freshness upon normal everyday physical movements such as taking off a jacket; pulling a shirt over your head; or taking off/putting on socks.

One aspect of the invention provides a non-fibrous laundry detergent sheet comprising: (a) at least one surfactant; (b) at least one film former; and (c) a friable microcapsule; wherein said laundry detergent sheet has a thickness ranging from 0.1 mm to 2 mm, a length-to-thickness aspect ratio of at least 5:1, and a width-to-thickness aspect ratio of at least 5:1.

Another aspect of the invention provides for a method of making a non-fibrous laundry detergent sheet comprising the step of dispensing a microcapsule to a precursor non-fibrous laundry detergent sheet, wherein the precursor non-fibrous laundry detergent sheet comprising (a) at least one surfactant; (b) at least one film former; and (c) a thickness ranging from 0.1 mm to 2 mm.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims. The following detailed description of the illustrative embodiments can be understood when read in conjunction with the following drawings, and in which:

DETAILED DESCRIPTION OF THE INVENTION

Figure 1:
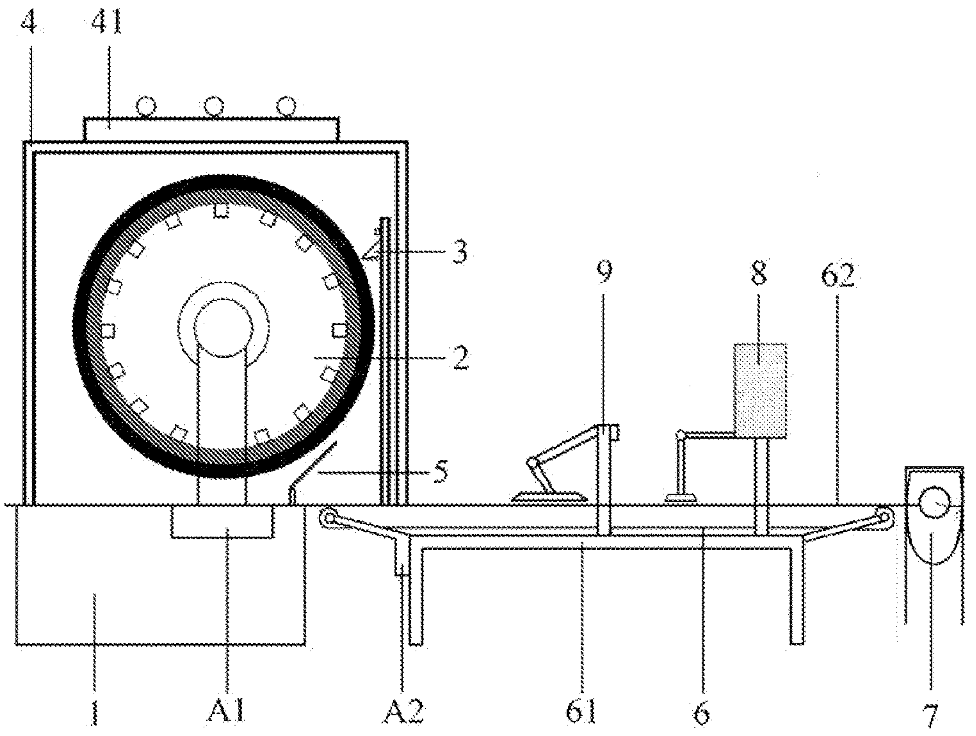
FIG. 1 is a cylinder laundry detergent sheet production system suitable for making a non-fibrous laundry detergent sheet comprising a friable microcapsule of the present invention.

Features and benefits of the various embodiments of the present invention will become apparent from the following description, which includes examples of specific embodiments intended to give a broad representation of the invention. Various modifications will be apparent to those skilled in the art from this description and from practice of the invention. The scope of the present invention is not intended to be limited to the particular forms disclosed and the invention covers all modifications, equivalents, and alternatives falling within the spirit and scope of the invention as defined by the claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

As used herein, articles such as "a" and "an" when used in a claim, are understood to mean one or more of what is claimed or described. The terms "comprise," "comprises," "comprising," "contain," "contains," "containing," "include," "includes" and "including" are all meant to be non-limiting.

As used herein, the term "water-soluble" refers to a solubility of more than about 30 grams per liter (g/L) of deionized water measured at 20° C. and under the atmospheric pressure. The term "substantially water-soluble" refers to a solubility of more than about 25 grams per liter (g/L) of deionized water measured at 20° C. and under the atmospheric pressure.

As used herein, the term "sheet" refers to a three-dimensional shape having a thickness, a length, and a width, while the length-to-thickness aspect ratio and the width-to-thickness aspect ratio are both at least about 5:1, and the length-to-width aspect ratio is at least about 1:1. Preferably, the length-to-thickness aspect ratio and the width-to-thickness aspect ratio are both at least about 10:1, and the length-to-width aspect ratio is at least about 1.2:1. More preferably, the length-to-thickness aspect ratio and the width-to-thickness aspect ratio are both at least about 15:1, and the length-to-width aspect ratio is at least about 1.5:1. Most preferably, the length-to-thickness aspect ratio and the width-to-thickness aspect ratio are both at least about 20:1, and the length-to-width aspect ratio is at least about 1.618:1.

As used herein, the term "non-fibrous" refers to a structure that is free of or substantially free of fibrous elements. "Fibrous element" as used herein means elongated particulate having a length greatly exceeding its average diameter, i.e., a length-to-average-diameter aspect ratio of at least 10:1, and an average diameter of no more than 1 mm.

As used herein, the term "laundry detergent" refers to all-purpose or "heavy-duty" washing agents, especially cleaning detergents, for fabrics, as well as cleaning auxiliaries such as bleach, rinse aids, additives, or pre-treat types.

As used herein, the term "Water Dissolvability" refers to the ability of a sample material to dissolve in water within a specific time period at 20° C. and under the atmospheric pressure without any stirring. This parameter is measured by placing 10 grams of the sample material in 1 liter of deionized water at 20° C. and under the atmospheric pressure for one (1) minute without any stirring. The remaining undissolved solids then are filtered out from the solution and immediately weighed (without drying). The Water Dissolvability is calculated as $$\frac{\text{Weight of Undissolved Solids}}{\text{10 grams}} \times 100\%.$$

As used herein, the terms "consisting essentially of" means that the composition contains no ingredient that will interfere with benefits or functions of those ingredients that are explicitly disclosed. Further, the terms "essentially free of," "substantially free of" or "substantially free from" means that the indicated material is present in the amount of from 0 wt % to about 1 wt %, or preferably from 0 wt % to about 0.5 wt %, or more preferably from 0 wt % to about 0.1 wt %, and most preferably it is not present at analytically detectable levels. The term "substantially pure" or "essentially pure" means that the indicated material is present in the amount of from about 99.5 wt % to about 100 wt %, preferably from about 99.9 wt % to about 100 wt %, and more preferably from 99.99 wt % to about 100 wt %, and most preferably all other materials are present only as impurities below analytically detectable levels.

As used herein, all concentrations and ratios are on a weight basis unless otherwise specified. All temperatures herein are in degrees Celsius (° C.) unless otherwise indicated. All conditions herein are at 20° C. and under the atmospheric pressure, unless otherwise specifically stated. All polymer molecular weights are determined by weight average number molecular weight unless otherwise specifically noted.

The laundry detergent sheet of the present invention is non-fibrous, i.e., it is free of or substantially free of fibrous elements. Such a laundry detergent sheet can be formed by first providing a slurry containing raw materials dissolved or dispersed in water, and then shaping the slurry into a sheet-like form. Drying is carried out either simultaneously with the shaping step, or it can be carried out subsequently, to remove water and form a finished sheet with little or no moisture content (e.g., less than 3 wt % water).

The laundry detergent sheet of the present invention is completely or substantially water-soluble. In other words, it does not contain a water-insoluble substrate, as some of the conventional laundry detergent sheets do. The laundry detergent sheet of the present invention has a Water Dissolvability of at least 90%, preferably at least 95%, and more preferably at least 98%, and most preferably at least 99%. Preferably, the entire laundry detergent sheet of the present invention can be completely dissolved in a liter of deionized water, i.e., leaving no visible residue in the solution, within 15 seconds, more preferably within 10 seconds, and more preferably within 5 seconds, at 20° C. under atmospheric pressure and without any stirring.

The laundry detergent sheet of the present invention can have any shape or size, as long as its thickness, its length, and its width are characterized by a length-to-thickness aspect ratio of at least about 5:1, a width-to-thickness aspect ratio of at least about 5:1, and a length-to-width aspect ratio of at least about 1:1. Preferably, the length-to-thickness aspect ratio and the width-to-thickness aspect ratio are both at least about 10:1, and the length-to-width aspect ratio is at least about 1.2:1. More preferably, the length-to-thickness aspect ratio and the width-to-thickness aspect ratio are both at least about 15:1, and the length-to-width aspect ratio is at least about 1.5:1. Most preferably, the length-to-thickness aspect ratio and the width-to-thickness aspect ratio are both at least about 20:1, and the length-to-width aspect ratio is at least about 1.618:1. The thickness of the laundry detergent sheet of the present invention may range from about 0.1 mm to about 10 cm, preferably from about 0.2 mm to about 5 mm, more preferably from about 0.3 mm to about 4 mm, and most preferably from about 0.5 mm to about 2 mm. The width of the laundry detergent sheet may range from about 2 cm to about 1 meter, preferably from about 5 cm to about 50 cm, more preferably from about 10 cm to about 40 cm. The length of the laundry detergent sheet may range from about 2 cm to about 50 meters, preferably from about 5 cm to about 1 meter, and more preferably from about 10 cm to about 80 cm.

In a preferred but not necessary embodiment of the present invention, the laundry detergent sheet has a golden rectangular shape (i.e., with a length-to-width aspect ratio of about 1.618:1), and it is characterized by a width of about 10-15 cm and a thickness of about 0.5 mm to about 2 mm. Such a golden rectangular shape is aesthetically pleasing and delightful to the consumers, so multiple sheets of such shape can be stacked up and packaged together for sale in a container that is also characterized by a similar golden rectangular shape.

In an alternative embodiment of the present invention, the laundry detergent sheet has an elongated shape (i.e., with a length-to-width aspect ratio of about 10-50:1), and it is characterized by a width of about 10-15 cm and a thickness of about 0.5 mm to about 2 mm. Such elongated shape allows the laundry detergent sheet to be rolled up or folded into a compact unit for easy of packaging, storage, shipment and display.

The laundry detergent sheet of the present invention is characterized by a sufficiently high Surfactant Activity, e.g., at least 30%, preferably at least 50%, more preferably at least 60%, and most preferably at least 70%. Such high Surfactant Activity provides a very compact and concentrated form of laundry detergent, which is particularly convenient for consumers who travel often and need to do laundry on the road. Further, shipping and handling costs for such compact and concentrated form are significantly reduced, in comparison with the traditional powder or liquid forms of laundry detergents, which make this laundry detergent sheet particularly desirable to be marketed through e-commerce channels.

Preferably, the laundry detergent sheet of the present invention has certain attributes that render it aesthetically pleasing to the consumers. For example, the sheet may have a relatively smooth surface, thereby providing a pleasant feel when touched by the consumer. Further, it is desirable that the laundry detergent sheet may have little or no perceivable pores on its surface.

It is also desirable that the laundry detergent sheet of the present invention is strong to withstand substantive mechanical forces without losing its structural integrity, yet at the same time is sufficiently flexible for ease of packaging and storage.

The present invention is based, in part, on the discovery that there can be less breakage of friable perfume microcapsules ("PMC") if the friable PMCs are added after a sheet forming step (and optionally before a stamping/embossing step) even if there are additional capital costs associated with such a step. These capital costs are more than off-set by the improved yield obtained in unruptured friable PMC delivered to the final non-fibrous laundry detergent sheet product.

PMC

One aspect of the invention provides a non-fibrous laundry detergent sheet comprising a friable PMC. "Friability" refers to the propensity of the microcapsules to rupture or break open when subjected to direct external pressures or shear forces. For purposes of the present invention, the microcapsules utilized are "friable" if, while attached to fabrics treated therewith, they can be ruptured by the forces encountered when the capsule-containing fabrics are manipulated by being worn or handled (thereby releasing the contents of the capsule). Friable perfume microcapsules are distinguished from moisture-activated microcapsules such as those microcapsules comprising mostly of cyclodextrin.

Friable PMC are attractive for use in non-fibrous laundry detergent sheets because not only do the friable PMC enables top-note scent characters to deposit onto fabrics, but also allows the consumer to experience these scent types throughout the day while wearing their article of clothing. Friable PMC rupture and release perfume by a mechanical means (e.g., friction)—not a chemical means (e.g., water hydrolysis). Minimal fracture pressure is typically needed to break the structure such as normal everyday physical movements such as taking off a jacket; pulling a shirt over your head; or taking off/putting on socks. Furthermore, friable PMC also allow the consumer to have a delightful scent experience on fabrics which have been in storage even for long durations of time due to their ability to protect perfume from volatilization to the surrounding air space.

Microcapsules of the current invention are formed by a variety of procedures that include, but are not limited to, coating, extrusion, spray-drying, interfacial, in-situ and matrix polymerization. The possible shell materials vary widely in their stability toward water (i.e., laundry washing and laundry rinsing). Among the most stable are polyoxymethyleneurea (PMU)-based materials, which may hold certain PRMs for even long periods of time in aqueous solution (or product). Such systems include but are not limited to urea-formaldehyde and/or melamine-formaldehyde.

Generally microcapsules comprise a shell material and a core material, said shell material encapsulating said core material, said core material comprising a perfume composition and said shell comprising a material selected from the group consisting of polyethylenes; polyamides; polystyrenes; polyisoprenes; polycarbonates; polyesters; polyacrylates; aminoplasts, in one aspect said aminoplast comprises a polyureas, polyurethane, and/or polyureaurethane, in one aspect said polyurea comprises polyoxymethyleneurea and/or melamine formaldehyde; polyvinylamine, polyvinyl formamide, polyolefins; polyvinyl alcohol, polysaccharides, in one aspect alginate and/or chitosan; gelatin; shellac; epoxy resins; vinyl polymers; water insoluble inorganics; silicone; and mixtures thereof. The friable PMC may have a volume weighted mean particle size from about, from 5 microns to 45 microns more preferably from 8 microns to 25 microns, or alternatively a volume weighted mean particle size from, from about 25 microns to 60 microns, more preferably from 25 microns to 60 microns. In one example, the shell comprises melamine formaldehyde and/or cross linked melamine formaldehyde.

The shell material may be coated by a water-soluble cationic polymer, for example, selected from the group that consists of polysaccharides, cationically modified starch and cationically modified guar, polysiloxanes, dimethyldiallylammonium polyhalogenides, copolymers of dimethyldiallylammonium polychloride and vinyl pyrrolidone, acrylamides, imidazoles, imidazolinium halogenides and imidazolium halogenides and polyvinyl amine and its copolymers with N-vinyl formamide. In one example, the coating that coats said shell, comprises a cationic polymer and an anionic polymer. In another example, said cationic polymer comprises hydroxyl ethyl cellulose; and said anionic polymer comprises carboxyl methyl cellulose.

The process for making friable PMC may include one or more of the following steps:

a) preparing a first solution that may comprise, based on total solution weight from 20% to 90%, from 40% to 80%, or even from 60% to 80% water, of a first emulsifier and a first resin, the ratio of said first emulsifier and said first resin being from 0.1:0 to 10:0, from about 0.1:1 to 10:1, from 0.5:1 to 3:1, or even from 0.8:1 to 1.1:1;
b) preparing a second solution that may comprise based on total solution weight from 20% to 95% water, of a second emulsifier and a second resin, the ratio of said second emulsifier and said second resin being from 0:1 to 3:1, from 0.04:1 to 0.2:1, or even from 0.05:1 to 0.15:1;
c) combining a core material that may comprise a perfume disclosed in the present specification and said first solution to form a first composition;
d) emulsifying said first composition;
e) combining said first composition and said second solution to form a second composition and optionally combining any processing aids and said second composition—said first composition and said second solution may be combined in any order but in one aspect said second solution is added to said first composition or said second solution and said first composition are combined simultaneously;

f) mixing said second composition for at least 15 minutes, at least 1 hour or even from 4 hours to 100 hours at a temperature of from 25° C. to 100° C., from 45° C. to 90° C., or even from 50° C. to 80° C. heat and optionally combining any processing aids to said second composition;

g) optionally combining any scavenger material, structurant, and/or anti-agglomeration agent with said second composition during step f.) or thereafter—such materials may be combined in any order but in one aspect the scavenger material is combined first, any structurant second, and then anti-agglomeration agent is combined; and h) optionally spray drying said second composition.

In one or more aspects of the process, said first and second resins may comprise the reaction product of an aldehyde and an amine, suitable aldehydes include, formaldehyde. Suitable amines include melamine, urea, benzoguanamine, glycoluril, and mixtures thereof. Suitable melamines include, methylol melamine, methylated methylol melamine, imino melamine and mixtures thereof. Suitable ureas include, dimethylol urea, methylated dimethylol urea, urea-resorcinol, and mixtures thereof.

In one or more aspects of the process, said first and second emulsifiers may comprise a moiety selected from the group consisting of carboxy, hydroxyl, thiol, amine, amide and combinations thereof. In one aspect, said emulsifier may have a pKa of less than 5, preferably greater than 0 but less than 5. Emulsifiers include acrylic acid-alkyl acrylate copolymer, poly(acrylic acid), polyoxyalkylene sorbitan fatty esters, polyalkylene co-carboxy anhydrides, polyalkylene co-maleic anhydrides, poly(methyl vinyl ether-co-maleic anhydride), poly(propylene-co-maleic anhydride), poly(butadiene co-maleic anhydride), and poly(vinyl acetate-co-maleic anhydride), polyvinyl alcohols, polyalkylene glycols, polyoxyalkylene glycols, and mixtures thereof.

In one or more aspects of the process, the pH of the first and second solutions may be controlled such that the pH of said first and second solution is from about 3.0 to 7.0.

In one or more aspects of the process, during step f.), from 0% to 10%, from 1% to 5% or even from 2% to 4%, based on total second composition weight, of a salt comprising an anion and cation, said anion being selected from the group consisting of chloride, sulfate, phosphate, nitrate, polyphosphate, citrate, maleate, fumarate and mixtures thereof; and said cation being selected from the group consisting of a Periodic Group IA element, Periodic Group IIA element, ammonium cation and mixtures thereof, preferably sodium sulfate, may be combined with said second composition.

In one or more aspects of the process, any of the aforementioned processing parameters may be combined.

Supplemental teachings of making suitable encapsulates as well as suitable shell materials are described in U.S. Pat. No. 6,869,923 B1 and US Published Patent Applications Nos. 2005/0276831 A1 and 2007/020263 A1. Suitable equipment for use in the processes disclosed herein may include continuous stirred tank reactors, homogenizers, turbine agitators, recirculating pumps, paddle mixers, ploughshear mixers, ribbon blenders, vertical axis granulators and drum mixers, both in batch and, where available, in continuous process configurations, spray dryers, and extruders. Such equipment can be obtained from Lodige GmbH (Paderborn, Germany), Littleford Day, Inc. (Florence, Ky., U.S.A.), Forberg AS (Larvik, Norway), Glatt Ingenieurtechnik GmbH (Weimar, Germany), Niro (Soeborg, Denmark), Hosokawa Bepex Corp. (Minneapolis, Minn., U.S.A.), Arde Barinco (New Jersey, U.S.A.).

Although the a preferred aspect of the invention is directed to perfume encapsulated within the friable microcapsule, i.e., a friable PMC, the present invention is not be limited to only those microcapsules encapsulating perfume. Rather, the friable microcapsules may encapsulate any active that is suitable to have on clothing. Non-limiting examples of such actives include skin care agents (such as aloe vera or skin moisturizer) or insect repellent (such as DEET).

Microcapsule Slurry and Microcapsule Slurry Tank

One aspect of the invention comprises a microcapsule slurry, preferably wherein the microcapsule is a friable microcapsule or even more preferably a friable perfume microcapsule, contained in the microcapsule slurry tank.

The term "microcapsule slurry tank" is used herein the broadest sense to include any container suitable for containing commercial quantities of a microcapsule slurry. The microcapsule slurry tank may comprise a heating element that imparts heat to the microcapsule slurry contained within the microcapsule slurry tank. The microcapsule slurry tank may also comprise a mixing element.

The term "heating element" is used herein the broadest sense to include any device that may impart heat to the microcapsule slurry contained within the microcapsule slurry tank. In another embodiment, the microcapsule slurry is at a heated temperature in the microcapsule slurry tank (i.e., the microcapsule slurry is heated while in the microcapsule slurry tank or delivered to the microcapsule slurry already in a heated form, or combination thereof). Non-limiting examples of a heating element may include: electric heat tracing in the jacket of the microcapsule slurry tank (e.g., there is an outer layer and inner layer to the microcapsule slurry tank and between these layers there is an electric tracing that is controlled via a computer).

The term "mixing elements" is used herein the broadest sense and includes any means of mixing the microcapsule slurry in the microcapsule slurry tank on a commercial scale. Non-limiting examples of mixing elements includes a wall scraper, agitator, recycle pump, or combinations thereof. A wall scraper works by scraping, in a circular pattern, microcapsule slurry that has adhered to the wall of the microcapsule slurry tank. An agitator is located at the bottom of the microcapsule slurry tank. Much like a blender, an agitator rotates in a circular fashion such that the microcapsule slurry is not allowed to settle at the bottom of the microcapsule slurry tank.

A recycle pump pushes the microcapsule slurry from the bottom of the vessel through piping and back into the top of the microcapsule slurry tank. Manufacturers of mixing elements include Chemineer Kinetics.

Preferably the microcapsule slurry is heated within at least about ±30° C., preferably ±20° C., preferably ±10° C. of the temperature of precursor laundry detergent sheet (i.e., after the sheet is removed from a roller) to which the microcapsule slurry is applied (i.e., dispensed thereto). For purposes of this invention, the temperature of the detergent sheet is taken immediately before the microcapsule slurry is dispensed thereto. An infrared temperature gun is one method of taking the temperature under these conditions.

In one example, the microcapsule slurry is at a temperature from 50° C. to 100° C., alternatively from 55° C. to 99° C., alternatively 60° C. to 98° C. For purposes of this invention, the temperature is of the microcapsule slurry is assessed as the slurry is contained in the microcapsule slurry tank.

In one example, the precursor laundry detergent sheet (after the detergent sheet forming step, but before the microcapsule slurry is dispensed to said detergent sheet) is at a temperature from 50° C. to 100° C., alternatively from 55° C. to 99° C., alternatively 60° C. to 98° C.

This aspect of the invention is based, in part, on the observation that if the microcapsule slurry is not of sufficient elevated temperature upon the addition of the detergent sheet the microcapsule treated detergent sheet then the potential for several negatives including imperfections to the sheet (e.g., less smooth surface, or bumps or other undesirable effects to the aesthetics). Without wishing to be bound by theory, this temperature difference may impact the "curing" of the sheet.

Another aspect of the invention provides for the amount of water in the microcapsule slurry to be minimized. For example, the microcapsule slurry comprises less than 75% water, alternatively less than 50% water, alternatively less than 42% water, by weight of the microcapsule slurry. In another example, the microcapsule slurry comprises from 75% to 20% water, alternatively from 65% to 30%, alternatively from 60% to 35%, alternatively from 50% to 38% by weight of the microcapsule slurry.

Some water in the microcapsule slurry is desirable. Many suppliers of friable PMC provide the friable PMC as a friable PMC slurry comprising water (vs. a powder form). These friable PMC slurries are typically less expensive than powdered or dry forms of the same. Moreover, powdered forms of the friable PMC or those friable PMC slurries with high non-aqueous solvent levels may pose safety issues given the flammability associated with fine dust of the PMC and the flammability associated with some solvents, respectively. Water in the PMC slurry may also provide more uniform distribution of the PMC in the PMC slurry such as to avoid additional mixing steps such as ball mills and colloid mills. Preferably PMC is incorporated into the laundry detergent sheet without, or substantially without, ball milling or colloid milling steps.

Yet another aspect of the invention provides for mixing the microcapsule slurry while the slurry is contained in the perfume slurry tank. Suitable ways of the mixing the slurry while in the perfume slurry tank include: a wall scraper, agitator, or combination thereof in the microcapsule slurry tank; or a static mixer in the pipe to or from the microcapsule slurry tank; or combinations thereof. Mixing by ball mills, colloid mills should preferably be avoided as to avoid breakage of the microcapsules. This aspect of the invention is based, in part, on the observation that mixing the PMC slurry provides more homogenous, uniform, incorporation of the microcapsule in the finished product.

Yet in another aspect of the invention, the microcapsule slurry comprises a structurant. While not being bound by theory, it is believed that the anionic materials that are sometimes part of the microcapsule slurry may adversely interact with the cationic materials that may be part of the precursor laundry detergent sheet (or even visa versa). The interaction between anionic and cationic species may lead to aggregation or phase separation. In addition to the unacceptable aesthetics that results from aggregation of particles, such aggregates may result in rapid phase separation of the particles from the bulk phase. It is discovered that such aggregates may be prevented by the addition of structurants chosen from salts, polymers, or combinations thereof. Useful structurants may include: (1) divalent salts such as: magnesium salts, e.g., magnesium chloride, magnesium acetate, magnesium phosphate, magnesium formate, magnesium boride, magnesium titanate, magnesium sulfate heptahydrate; calcium salts, e.g., calcium chloride, calcium formate, calcium calcium acetate, calcium bromide; (2) trivalent salts such as: aluminum salts, e.g., aluminum sulfate, aluminum phosphate, aluminum chloride n-hydrate; and (3) polymers that have the ability to suspend anionic particles, such as soil suspension polymers, e.g., (polyethylene imines, alkoxylated polyethylene imines, polyquaternium-6 and polyquaternium-7).

In one aspect, calcium formate and/or formic acid may be added to a microcapsule slurry comprising water. Calcium formate and/or formic acid is typically combined with, based on total aqueous microcapsule slurry weight, at a level of from 0.6% to 3%, from 1% to 2%, alternatively from 1.2% to 1.5%, of the microcapsule slurry. An additional benefit with the use of calcium formate and/or formic acid may include microbial inhibition. The structurant, for example, may comprise from 0.1% to 5%, alternatively, 0.5% to 4%, alternatively 0.6% to 3%, by weight of the microcapsule slurry.

Optionally the microcapsule slurry comprises a formaldehyde scavenger.

The flow of the microcapsule slurry, exiting from through piping from the microcapsule slurry tank, is pumped and can be regulated by a flow meter. The detergent sheet and friable PMC slurry may combine resulting in a composition that comprises from 0.1% to 10%, alternatively from 0.5% to 7%, alternatively from 1% to 6%, alternatively from 1.5% to 5%, alternatively from 1.5% to 4%, friable PMC by weight of the composition (wherein the composition comprises the detergent sheet and PMC). The combined detergent sheet and friable PMC, upon drying, may comprise from 5% to 0%, alternatively less than 4%, alternatively less than 3%, alternatively less than 2%, alternatively less than 1%, alternatively less than 0.5%, alternatively less than about 0.1%, alternatively substantially free, alternatively free, of water, by weight of the composition (wherein the composition comprises the detergent sheet and PMC).

A nozzle is fluidly connected with the microcapsule slurry tank by way of through piping. An electromagnetic valve is placed on the through piping or nozzle. The nozzle is capable of spraying or otherwise dispensing the PMC slurry onto the precursor laundry detergent sheet.

Less preferred, but within the scope of one aspect of the invention, is adding a composition of a friable PMC comprising a low amount of water (e.g., 5% to 0% water by weight of the composition such as in a powdered or granular form of the friable PMC) to the precursor laundry detergent sheet. The substantially solid form of the friable PMC or low water composition containing PMC may be added after the detergent sheet is formed. The process may include spraying the PMC composition to detergent sheet. The low water composition of the friable PMC may comprise less than 5%, or 4%, or 3%, or 2%, or 1%, or 0.5%, or 0.1% water by weight of the composition. The lower water composition of the friable PMC may comprise from 99.9% to 1%, alternatively from 80% to 99%, alternatively from 90% to 99% of the friable PMC by weight of the composition. In yet another embodiment, the low water composition of friable PMC is free or substantially free of detersive surfactants. The low water composition of friable PMC may be in a powder or granular form.

Surfactant Sheet Forming Steps

Step(s) in making the non-fibrous laundry detergent sheet are described.

Figure 2:
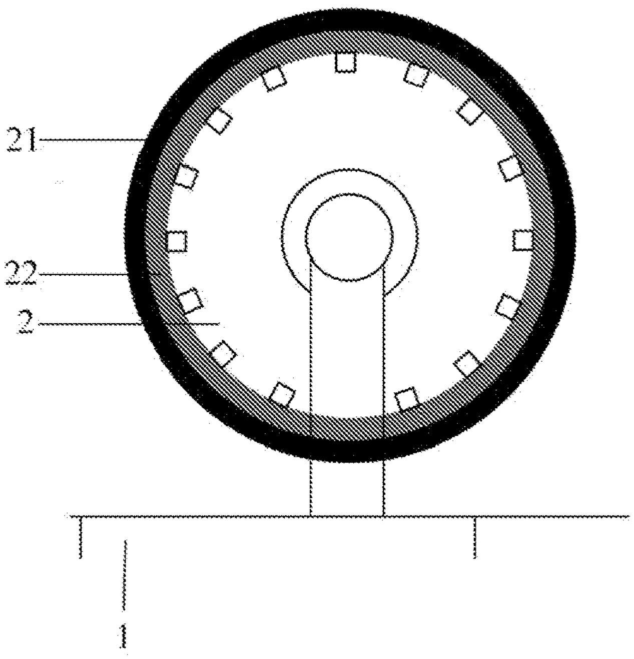
FIG. 2 is a heated rotatable cylinder of the system of FIG. 1.
Figure 3:
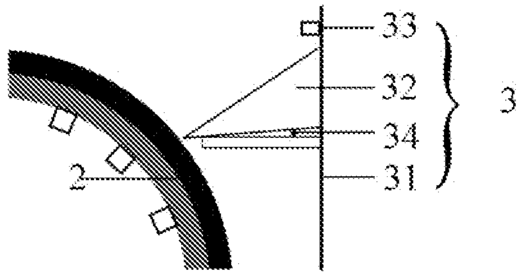
FIG. 3 is a feeding mechanism of the system of FIG. 1.
Figure 4:
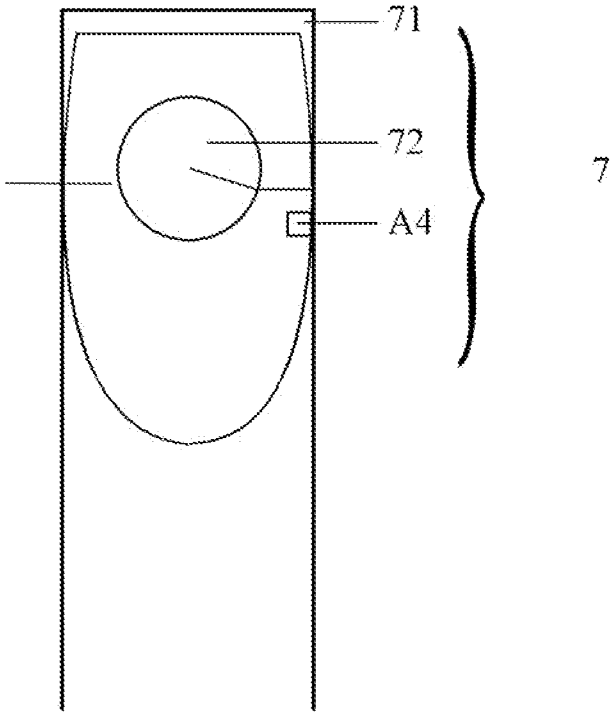
FIG. 4 is a slicing device of system of FIG. 1.
Figure 5:
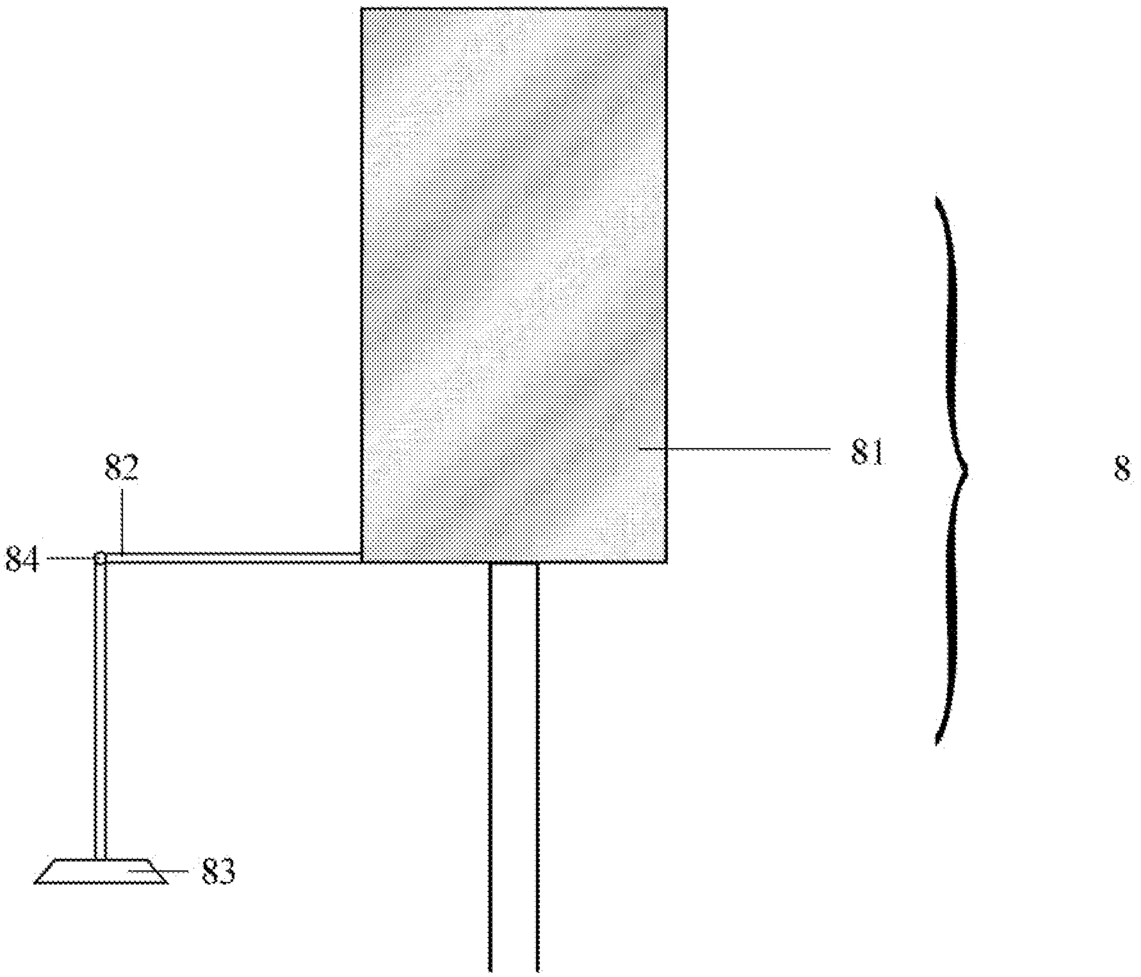
FIG. 5 is a microcapsule slurry tank device of the system of FIG. 1.

Referring to FIG. 1-6 of a cylinder laundry detergent sheet production system, the system comprises a base bracket 1, a heated rotatable cylinder 2 (see FIG. 2) is installed on the said base bracket 1. A heated rotatable cylinder 2 can be driven by the motorized drive A1 installed on the said base bracket 1, and work at a predetermined rotation speed. Said rotating heat roll 2 is also coated with a non-stick coating 21. The non-stick coating 21 may be overlying on the outer surface of the heated rotatable cylinder 2, or the said non-stick coating 21 is fixed to medium 22 of the outer surface of the heated rotatable cylinder 2. The medium 22 includes, but is not limited to, heat-resisting non-woven fabrics, heat-resisting carbon fiber, heat-resisting metal or non-metallic mesh and the like. The said non-stick coating 21 effectively preserves the activity of the laundry detergent composition in the sheet material from damage.

There is also a feeding mechanism 3 (see FIG. 3) installed on the said bracket 1 which is for adding the liquid laundry detergent sheet material (that is free of friable microcapsules) to said heated rotatable cylinder 2. The liquid laundry detergent sheet material may comprise surfactants and film former materials described below. Notably, the liquid laundry detergent sheet material is free of friable microcapsules. The feeding mechanism 3 includes the feeding rack 31 installed on the said bracket 1; at least one (preferably two) feeding hopper(s) 32 installed on the said feeding rack 31; as well as an imaging device 33 for dynamic observation of the feeding. The imaging device 33 is installed on the said feeding rack 31 as well as the adjustment device 34 for adjusting the position and inclination angle of said feeding hopper 32. By adjusting the said adjustment device 34 to adjust the distance between said feeding hopper 32 and the outer surface of the said heated rotatable cylinder 2, the need for different thicknesses of the laundry detergent sheet production can be met. The adjustment device 34 can adjust the feeding hopper 32 to different angles as to meet the material requirements of speed and quality.

There is also a heating shield 4 (see FIG. 1) installed on the said bracket 1, to prevent rapid heat lost. Otherwise, the laundry detergent sheet liquid material can be dried too quickly by the said heated rotatable cylinder 2. The heating shield can also effectively save energy needed by the said heated rotatable cylinder 2, thereby achieving reduced energy consumption and provide cost savings. The heating shield 4 is a modular assembly structure, or integrated structure, and can be freely detached from the said bracket 1. The suction device 41 is also installed on the heating shield 4, for sucking the hot steam, to avoid any water condensate falling on the raw material of laundry detergent sheet.

There is also a start feeding mechanism 5 (see FIG. 1) installed on the said bracket 1, which is for scooping up the laundry detergent sheet raw material dried by the said heated rotatable cylinder 2. The start feeding mechanism 5 is installed on the said bracket 1, or on one side of the self-propelled platform 6, for transporting down the scooped laundry detergent sheet raw material (i.e., a precursor non-fibrous laundry detergent sheet). The said start feeding mechanism 5 can automatically or manually move close and go away from the heated rotatable cylinder 2.

Without wishing to be bound by theory, the use of the start feeding mechanism 5 can prematurely burst friable microcapsules if these microcapsules had otherwise been added to the original liquid laundry detergent sheet material.

The other side of the said self-propelled platform 6 is connected to the slicing device 7, for shape slicing the laundry detergent sheet raw material, said self-propelled platform 6 is located at the bottom or one side of the microcapsule slurry tank device 8

Optionally, if an embossing step is desired to the detergent sheet, said self-propelled platform is located at the bottom or one side of an embossing device 9. The embossing device 9 (see FIG. 6) is assembled by the freely stretching and rotating mobile arm 91, freely exchangeable embossing mold 92 installed on the one end of the said mobile arm 91, and the drive A3 for driving the said mobile arm 91.

Preferably any embossing steps are conducted before the dispensing of PMC slurry to the precursor non-fibrous laundry detergent sheet. Embossing the detergent sheet after microcapsule addition may burst the friable microcapsules.

Wherein, the said self-propelled platform 6 (see FIG. 1) is assembled by the platform bracket 61, the self-propelled belt 62 installed on the platform bracket 61, and the drive A2 installed on platform bracket 61, for driving said self-propelled belt 62.

The said slicing device 7 (see FIG. 4) is assembled by the slicing device housing 71, the cutter 72 placed inside the said slicing device housing 71, and the drive A4 installed in the said slicing device housing 71, for driving the cutter 72.

The microcapsule slurry tank device 9 (see FIG. 5) is assembled by microcapsule slurry tank 81 used for storing the microcapsule slurry (and is preferably pressurized or gravity fed). Nozzle 83 is fluidly connected with the microcapsule slurry tank 81 by way of through piping 82. An electromagnetic valve 84 is placed on said through piping 82 or nozzle 83. The nozzle 83 is on the top of said self-propelled belt 62 of the said self-propelled platform 6. The nozzle 83 is capable of spraying or otherwise dispensing the PMC slurry onto the detergent sheet.

The making process of the non-fibrous laundry detergent sheet is described. Firstly, the heated rotatable cylinder 2, with the non-stick coating 21, on the said bracket 1, is driven by the drive A1. Next, the adjustment device 34 adjusts the feeding mechanism 3 so that the distance between the feeding hopper 32 and the outer surface of the heated rotatable cylinder 2 reaches a preset value. Meanwhile, the feeding hopper 32 adds liquid laundry detergent sheet raw material (free of friable microcapsules) to the heated rotatable cylinder 2. The suction device 41 of the heating shield 4 sucks the hot steam generated by the heated rotatable cylinder 2. Next, the start feeding mechanism 5 scoops up the laundry detergent sheet upon evaporated water reaches a predetermined value. Drive A2 drives the self-propelled belt 62 of the self-propelled platform 6 to work to transport down the laundry detergent sheet raw material which is scooped up by the said start feeding mechanism 5. Drive A3 drives the mobile arm 91 of the embossing device 9 stretching and rotating freely, so that the embossing mold 92 can freely emboss the different shapes on the laundry detergent sheet material. Thereafter the electromagnetic valve 84 is opened in order to spray the microcapsule slurry in the pressure vessel 81 through nozzle 83 to the dried (and embossed) laundry detergent sheet raw material. Finally, drive A4 drives the cutter 72 of the slicing device 7 in order to cut the laundry detergent sheet into desired shapes to be packaged.

Surfactants

The non-fibrous laundry detergent sheet of the present invention may comprise at least one surfactant selected from the group consisting of anionic surfactants, nonionic surfactants, amphoteric surfactants, cationic surfactants, and combinations thereof. Such at least one surfactant form a surfactant system in the non-fibrous laundry detergent sheet, which can be present in an amount ranging from about 5% to about 90%, preferably from about 10% to about 90%, more preferably from about 20% to about 90%, still more preferably from about 30% to about 90%, and most preferably from about 50% to about 90%, by total weight of the non-fibrous laundry detergent sheet.

In a particularly preferred but not necessary embodiment of the present invention, the laundry detergent sheet may have a surfactant system containing only anionic surfactants, e.g., either a single anionic surfactant or a combination of two or more different anionic surfactants. Alternatively, the laundry detergent sheet of the present invention may have a composite surfactant system, e.g., containing a combination of one or more anionic surfactants with one or more nonionic surfactants, or a combination of one or more anionic surfactants with one or more amphoteric surfactants, or a combination of one or more anionic surfactants with one or more cationic surfactants, or a combination of all the above-mentioned types of surfactants (i.e., anionic, nonionic, amphoteric and cationic). Preferably but not necessarily, the laundry detergent sheet of the present invention has a composite surfactant system containing a combination of one or more anionic surfactants with one or more nonionic surfactants.

Anionic Surfactants

Anionic surfactants suitable for forming the laundry detergent sheet of the present invention can be readily selected from the group consisting of $C_6$-$C_{20}$ linear or branched alkyl benzene sulfonates (LAS), $C_6$-$C_{20}$ linear or branched alkyl sulfates (AS), $C_6$-$C_{20}$ linear or branched alkyl alkoxylated sulfates (AAS), $C_6$-$C_{20}$ linear or branched alkyl sulfonates, $C_6$-$C_{20}$ linear or branched alkyl carboxylates, $C_6$-$C_{20}$ linear or branched alkyl phosphates, $C_6$-$C_{20}$ linear or branched alkyl phosphonates, and combinations thereof. Preferred anionic surfactants of the present invention are selected from the group consisting of LAS, AS, AAS, and combinations thereof. The total amount of anionic surfactants in the laundry detergent sheet may range from 5% to 90%, preferably from 10% to 80%, more preferably from 20% to 75%, and most preferably from 30% to 70%, by total weight of the non-fibrous laundry detergent sheet.

Mid-Cut AS

A particularly preferred type of anionic surfactants for forming the non-fibrous laundry detergent sheet of the present invention are $C_6$-$C_{18}$ alkyl sulfates, which are referred to as "mid-cut AS" hereinafter, while each of which has a branched or linear unalkoxylated alkyl group containing from about 6 to about 18 carbon atoms. In a particularly preferred embodiment of the present invention, the mid-cut AS is present as the main surfactant in the laundry detergent sheet, i.e., it is present in an amount that is greater than 50% by total weight of all surfactants in said sheet, while other anionic surfactants (such as LAS and/or AAS) are present as co-surfactants for such mid-cut AS.

The mid-cut AS of the present invention has the generic formula of $R—O—SO_3^- M^+$, while R is branched or linear unalkoxylated $C_6$-$C_{18}$ alkyl group, and M is a cation of alkali metal, alkaline earth metal or ammonium. Preferably, the R group of the AS surfactant contains from about 8 to about 16 carbon atoms, more preferably from about 10 to about 14 carbon atoms, and most preferably from about 12 to about 14 carbon atoms. R can be substituted or unsubstituted, and is preferably unsubstituted. R is substantially free of any alkoxylation. M is preferably a cationic of sodium, potassium, or magnesium, and more preferably M is a sodium cation.

Such mid-cut AS surfactant(s) preferably functions as the main surfactant in the surfactant system of the non-fibrous laundry detergent sheet of the present invention. In other words, the mid-cut AS surfactant(s) are present in an amount of greater than 50% by total weight of all surfactants in the laundry detergent sheet.

Preferably, but not necessarily, the surfactant system of the present invention contains a mixture of mid-cut AS surfactants, in which $C_6$-$C_{14}$ AS surfactants are present in an amount ranging from about 85% to about 100% by total weight of the mixture. This mixture can be referred to as a "$C_6$-$C_{14}$-rich AS mixture." More preferably, such $C_6$-$C_{14}$-rich AS mixture contains from about 90 wt % to about 100 wt %, or from 92 wt % to about 98 wt %, or from about 94 wt % to about 96 wt %, or 100 wt % (i.e., pure), of $C_6$-$C_{14}$ AS.

In a particularly preferred embodiment of the present invention, the surfactant system contains a mixture of mid-cut AS surfactants comprising from about 30 wt % to about 100 wt % or from about 50 wt % to about 99 wt %, preferably from about 60 wt % to about 95 wt %, more preferably from about 65 wt % to about 90 wt %, and most preferably from about 70 wt % to about 80 wt % of $C_{12}$-$C_{14}$ AS, which can be referred to as a "$C_{12}$-$C_{14}$-rich AS mixture." Preferably, such $C_{12}$-$C_{14}$-rich AS mixture contains a majority of $C_{12}$ AS. In a most preferred embodiment of the present invention, the surfactant system contains a mixture of mid-cut AS surfactants that consist of $C_{12}$ and/or $C_{14}$ AS surfactants, e.g., 100% $C_{12}$ AS or from about 70 wt % to about 80 wt % of Cu AS and from 20 wt % to about 30 wt % of $C_{14}$ AS, with little or no other AS surfactants therein.

A commercially available mid-cut AS mixture particularly suitable for practice of the present invention is Texapon® V95 G from Cognis (Monheim, Germany).

Further, the surfactant system of the present invention may contain a mixture of mid-cut AS surfactants comprising more than about 50 wt %, preferably more than about 60 wt %, more preferably more than 70 wt % or 80 wt %, and most preferably more than 90 wt % or even at 100 wt % (i.e., substantially pure), of linear AS surfactants having an even number of carbon atoms, including, for example, $C_6$, $C_8$, $C_{10}$, $C_{12}$, $C_{14}$, $C_{16}$, and $C_{18}$ AS surfactants.

The amount of mid-cut AS surfactants used in the present invention may range from about 5% to about 90%, preferably from about 10% to about 80%, more preferably from about 20% to about 75%, and most preferably from about 30% to about 70%, by total weight of the non-fibrous laundry detergent sheet. In a most preferred embodiment of the present invention, the non-fibrous laundry detergent sheet contains from about 10 wt % to about 60 wt %, preferably from about 20 wt % to about 50 wt %, of pure $C_{12}$ AS or a $C_{12}$-$C_{14}$-rich AS mixture by total weight of such sheet, while the $C_{12}$-$C_{14}$-rich AS mixture contains from about 70 wt % to about 80 wt % of $C_{12}$ AS and from 20 wt % to about 30 wt % of $C_{14}$ AS by total weight of such mixture.

LAS

The non-fibrous laundry detergent sheet of the present invention may contain, either alone as a main surfactant, or preferably in combination with the mid-cut AS described hereinabove as its co-surfactant, a $C_6$-$C_{20}$ linear alkylbenzene sulfonate (LAS). In a particularly preferred embodiment of the present invention, LAS is present as the main surfactant in the laundry detergent sheet, i.e., it is present in an amount that is greater than 50% by total weight of all surfactants in said sheet, while other anionic surfactants (such as mid-cut AS and/or AAS) are present as co-surfactants for such LAS.

LAS anionic surfactants are well known in the art and can be readily obtained by sulfonating commercially available linear alkylbenzenes. Exemplary $C_6$-$C_{20}$ linear alkylbenzene sulfonates that can be used in the present invention include alkali metal, alkaline earth metal or ammonium salts of $C_6$-$C_{20}$ linear alkylbenzene sulfonic acids, and preferably the sodium, potassium, magnesium and/or ammonium salts of $C_{11}$-$C_{18}$ or $C_{11}$-$C_{14}$ linear alkylbenzene sulfonic acids. More preferred are the sodium or potassium salts of $C_{12}$ linear alkylbenzene sulfonic acids, and most preferred is the sodium salt of $C_{12}$ linear alkylbenzene sulfonic acid, i.e., sodium dodecylbenzene sulfonate.

If present, the amount of LAS in the non-fibrous laundry detergent sheet of the present invention may range from about 5% to about 90%, preferably from about 10% to about 80%, more preferably from about 20% to about 75%, and most preferably from about 30% to about 70%, by total weight of the laundry detergent sheet. In a most preferred embodiment of the present invention, the non-fibrous laundry detergent sheet contains from about 5 wt % to about 20 wt % of a sodium, potassium, or magnesium salt of Cu linear alkylbenzene sulfonic acid.

AAS

The non-fibrous laundry detergent sheet of the present invention may contain, either alone as a main surfactant, or preferably in combination with the mid-cut AS and/or LAS described hereinabove as a co-surfactant, a $C_{10}$-$C_{20}$ linear or branched alkylalkoxy sulfate (AAS) having an average degree of alkoxylation ranging from about 0.1 to about 5.

The AAS surfactants preferably are $C_{10}$-$C_{20}$ linear or branched alkylethoxy sulfate (AES) with the following formula (I):

$$R—O—(C_2H_4O)_x—SO_3^-M^+ \quad (I),$$

wherein R is a linear or branched alkyl chain having from 10 to 20 carbon atoms, either saturated or unsaturated; x averages from 1 to 3; and M is selected from the group consisting of alkali metal ions, ammonium, or substituted ammonium. Preferably, R is a linear or branched alkyl chain having from 12 to 16 carbon atoms; x averages 3; and M is sodium. The most preferred anionic surfactant for the practice of the present invention is sodium lauryl ether sulphate with an average degree of ethoxylation of about 3.

The AAS surfactants, if present, can be provided in an amount ranging from about 1% to about 30%, preferably from about 2% to about 20%, more preferably from about 5% to about 15%, by total weight of the non-fibrous laundry detergent sheet.

Nonionic Surfactants

The non-fibrous laundry detergent sheet of the present invention may contain one or more nonionic surfactants, which are to be used in combination with the anionic surfactants described hereinabove. Such nonionic surfactant(s) may be present in an amount ranging from 1% to 40%, preferably from 2% to 30%, more preferably from 5% to 25%, and most preferably from 10% to 20%, by total weight of such non-fibrous laundry detergent sheet.

Suitable nonionic surfactants useful herein can comprise any conventional nonionic surfactant. These can include, for e.g., amine oxide surfactants and alkoxylated fatty alcohols. The nonionic surfactants may be selected from the ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. In one example, the nonionic surfactant is selected from ethoxylated alcohols having an average of about 24 carbon atoms in the alcohol and an average degree of ethoxylation of about 9 moles of ethylene oxide per mole of alcohol. Other non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, $BAE_x$, wherein x is from 1 to 30; alkylpolysaccharides, and specifically alkylpolyglycosides; polyhydroxy fatty acid amides; and ether capped poly(oxyalkylated) alcohol surfactants. Suitable nonionic surfactants also include those sold under the tradename Lutensol® from BASF.

Preferred nonionic surfactants of the present invention include alkyl polyglucoside, alkyl alcohols, alkyl alkoxylated alcohols, alkyl alkoxylates, alkyl phenol alkoxylates, alkylcelluloses, polyhydroxy fatty acid amides, ether capped poly(oxyalkylated) alcohol surfactants. In a more preferred embodiment, the nonionic surfactant is selected from alkyl alkoxylated alcohols, such as a $C_{8-18}$ alkyl alkoxylated alcohol, and more specifically a $C_{8-18}$ alkyl ethoxylated alcohol. The alkyl alkoxylated alcohol may have an average degree of alkoxylation of from about 1 to about 50, or from about 1 to about 30, or from about 1 to about 20, or from about 1 to about 10. The alkyl alkoxylated alcohol can be linear or branched, substituted or unsubstituted.

In a most preferred embodiment, the non-fibrous laundry detergent sheet of the present invention contains a $C_{12-14}$ alkyl ethoxylated alcohol having an average degree of ethoxylation of from about 1 to about 10, or from about 1 to about 8, or from about 3 to about 7, in an amount ranging from about 1% to about 40%, preferably from about 5% to about 25%, and more preferably from about 10% to about 20%, by total weight of the laundry detergent sheet.

Adjunct Detergent Ingredients

The non-fibrous laundry detergent sheet of the present invention may optionally include one or more other adjunct detergent ingredients for assisting or enhancing cleaning performance or to modify the aesthetics of the sheet. Illustrative examples of such adjunct detergent ingredients include: (1) inorganic and/or organic builders, such as carbonates (including bicarbonates and sesquicarbonates), sulphates, phosphates (exemplified by the tripolyphosphates, pyrophosphates, and glassy polymeric meta-phosphates), phosphonates, phytic acid, silicates, zeolite, citrates, polycarboxylates and salts thereof (such as mellitic acid, succinic acid, oxydisuccinic acid, polymaleic acid, benzene 1,3,5-tricarboxylic acid, carboxymethyloxysuccinic acid, and soluble salts thereof), ether hydroxypolycarboxylates, copolymers of maleic anhydride with ethylene or vinyl methyl ether, 1,3,5-trihydroxy benzene-2,4,6-trisulphonic acid, 3,3-dicarboxy-4-oxa-1,6-hexanedioates, polyacetic acids (such as ethylenediamine tetraacetic acid and nitrilotriacetic acid) and salts thereof, fatty acids (such as $C_{12}$-$C_{18}$ monocarboxylic acids); (2) chelating agents, such as iron and/or manganese-chelating agents selected from the group consisting of amino carboxylates, amino phosphonates, polyfunctionally-substituted aromatic chelating agents and mixtures therein; (3) clay soil removal/anti-redeposition agents, such as water-soluble ethoxylated amines (particularly ethoxylated tetraethylene-pentamine); (4) polymeric dispersing agents, such as polymeric polycarboxylates and polyethylene glycols, acrylic/maleic-based copolymers and water-soluble salts thereof of, hydroxypropylacrylate, maleic/acrylic/vinyl alcohol terpolymers, polyethylene glycol (PEG), polyaspartates and polyglutamates; (5) optical brighteners, which include but are not limited to derivatives of stilbene, pyrazoline, coumarin, carboxylic acid, methinecyanines, dibenzothiphene-5,5-dioxide, azoles, 5- and 6-membered-ring heterocycles, and the like; (6) suds suppressors, such as monocarboxylic fatty acids and soluble salts thereof, high molecular weight hydrocarbons (e.g., paraffins, haloparaffins, fatty acid esters, fatty acid esters of monovalent alcohols, aliphatic $C_{18}$-$C_{40}$ ketones, etc.), N-alkylated amino triazines, propylene oxide, monostearyl phosphates, silicones or derivatives thereof, secondary alcohols (e.g., 2-alkyl alkanols) and mixtures of such alcohols with silicone oils; (7) suds boosters, such as $C_{10}$-$C_{16}$ alkanolamides, $C_{10}$-$C_{14}$ monoethanol and diethanol amides, high sudsing surfactants (e.g., amine oxides, betaines and sultaines), and soluble magnesium salts (e.g., $MgCl_2$, $MgSO_4$, and the like); (8) fabric softeners, such as smectite clays, amine softeners and cationic softeners; (9) dye transfer inhibiting agents, such as polyvinyl pyrrolidone polymers, polyamine N-oxide polymers, copolymers of N-vinylpyrrolidone and N-vinylimidazole, manganese phthalocyanine, peroxidases, and mixtures thereof; (10) enzymes, such as proteases, amylases, lipases, cellulases, and peroxidases, and mixtures thereof; (11) enzyme stabilizers, which include water-soluble sources of calcium and/or magnesium ions, boric acid or borates (such as boric oxide, borax and other alkali metal borates); (12) bleaching agents, such as percarbonates (e.g., sodium carbonate peroxyhydrate, sodium pyrophosphate peroxyhydrate, urea peroxyhydrate, and sodium peroxide), persulfates, perborates, magnesium monoperoxyphthalate hexahydrate, the magnesium salt of metachloro perbenzoic acid, 4-nonylamino-4-oxoperoxybutyric acid and diperoxydodecanedioic acid, 6-nonylamino-6-oxoperoxycaproic acid, and photoactivated bleaching agents (e.g., sulfonated zinc and/or aluminum phthalocyanines); (13) bleach activators, such as nonanoyloxybenzene sulfonate (NOBS), tetraacetyl ethylene diamine (TAED), amido-derived bleach activators including (6-octanamidocaproyl)oxybenzenesulfonate, (6-nonanamidocaproyl)oxybenzenesulfonate, (6-decanamidocaproyl)oxybenzenesulfonate, and mixtures thereof, benzoxazin-type activators, acyl lactam activators (especially acyl caprolactams and acyl valerolactams); and (14) any other known detergent adjunct ingredients, including but not limited to carriers, hydrotropes, processing aids, dyes or pigments, and solid fillers.

Film Former

The non-fibrous laundry detergent sheet of the present invention contains, in addition to the surfactant(s) described and adjunct detergent ingredients described hereinabove, at least one film former. Such at least one film former can be selected from water-soluble polymers, either synthetic or natural in origin and may be chemically and/or physically modified.

Suitable examples of water-soluble polymers for the practice of the present invention include polyalkylene glycols (also referred to as polyalkylene oxides or polyoxyalkylenes), polyvinyl alcohols, polysaccharides (such as starch or modified starch, cellulose or modified cellulose, pullulan, xanthum gum, guar gum, and carrageenan), polyacrylates, polymethacrylates, polyacrylamides, polyvinylpyrrolidones, and proteins/polypeptides or hydrolyzed products thereof (such as collagen and gelatin). Preferably, the film former to be used in the present invention is selected from the group consisting of polyalkylene glycols, polyvinyl alcohols, starch or modified starch, cellulose or modified cellulose, polyacrylates, polymethacrylates, polyacrylamides, polyvinylpyrrolidones, and combinations thereof. In a particularly preferred embodiment of the present invention, the non-fibrous laundry detergent sheet contains a polyethylene glycol (PEG) or a polyvinyl alcohol (PVA), either alone (i.e., without other film formers) or in combination with a polystarch, modified starch, cellulose, or modified cellulose.

In the execution of PEG, the PEG may be selected from poly(ethylene glycol) homopolymers and poly(ethylene glycol) copolymers having a weight average molecular weight of between about 2,000 and about 100,000 g/mol, preferably between about 4,000 and about 90,000 g/mol, and more preferably between about 6,000 and about 8,000 g/mol. Suitable poly(ethylene glycol) copolymers preferably contain at least about 50 wt % of PEG and may be selected from the group consisting of poly(lactide-block-ethylene glycol), poly(glycolide-block-ethylene glycol), poly(lactide-co-caprolactone)-block-poly(ethylene glycol), poly(ethylene glycol-co-lactic acid), poly(ethylene glycol-co-glycolic acid), poly(ethylene glycol-co-poly(lactic acid-co-glycolic acid), poly(ethylene glycol-co-propylene glycol), poly(ethylene oxide-block-propylene oxide-block-ethylene oxide), poly(propylene oxide-block-ethylene glycol-block-propylene glycol), and poly(ethylene glycol-co-caprolactone). Exemplary poly(ethylene glycol) homopolymers are commercially available from Sigma Aldrich, or from Dow under the tradename of CARBOWAX™, or from BASF under the tradename of Pluriol®. Exemplary poly(ethylene glycol) copolymers are commercially available from BASF under the tradenames of Pluronic® F127, Pluronic® F108, Pluronic® F68 and Pluronic® P105. A particularly preferred PEG for the practice of the present invention is a poly (ethylene glycol) homopolymer having a weight average molecular weight of between about 6,000 and about 80,000 g/mol.

In the execution of PVA, the PVA may be unmodified or modified, e.g., carboxylated or sulfonated. Preferably, the PVA is partially or fully alcoholised or hydrolysed. For example it may be from 40 to 100%, preferably 70 to 92%, more preferably 88% to 92%, alcoholised or hydrolysed. The degree of hydrolysis is known to influence the temperature at which the PVA starts to dissolve in water, e.g., 88% hydrolysis corresponds to a PVA film soluble in cold (i.e. room temperature) water, whereas 92% hydrolysis corresponds to a PVA film soluble in warm water. An example of preferred PVA is ethyoxylated PVA. A more preferred example of PVA is commercially available from Sekisui Specialty Chemicals America, LLC (Dallas, Tex.) under the tradename CELVOL®. Another more preferred example of PVA is the so-called G Polymer commercially available Nippon Ghosei.

The film former may be present in the non-fibrous laundry detergent sheet of the present invention at from about 1% to about 70%, preferably from about 2% to about 60%, more preferably from about 5% to about 50%, and most preferably from about 10% to about 40%, by total weight of the sheet.

In addition to the film former, the non-fibrous laundry detergent sheet may also comprise suitable additives such as plasticizers and solids, for modifying the properties of the film former. Suitable plasticizers are, for example, pentaerythritols such as depentaerythritol, sorbitol, mannitol, glycerine and glycols such as glycerol or ethylene glycol. Plasticizers are generally used in an amount of up to 35 wt %, for example from 5 to 35 wt %, preferably from 7 to 20 wt %, more preferably from 10 to 15 wt %. Solids such as talc, stearic acid, magnesium stearate, silicon dioxide, zinc stearate or colloidal silica may also be used, generally in an amount ranging from about 0.5 to 5 wt %.

The pH of the detergent sheet is about neutral to basic, preferably having a pH from 7 to 9, more preferably from 7.5 to 9.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a non-fibrous laundry detergent sheet comprising dispensing a microcapsule onto a precursor non-fibrous laundry detergent sheet, wherein the precursor non-fibrous laundry detergent sheet comprises: (a) at least one surfactant; (b) at least one film former; and wherein said non-fibrous laundry detergent sheet has a thickness ranging from 0.1 mm to 10 mm, wherein the microcapsule is dispensed at a temperature of about ±30° C. of the temperature of the precursor laundry detergent sheet, and wherein the microcapsule is dispensed at a temperature of about 50° C. to about 100° C.

2. The method of claim 1, wherein the microcapsule is dispensed as a microcapsule slurry.

3. The method of claim 2, wherein the microcapsule comprises a friable microcapsule.

4. The method of claim 3, wherein the friable microcapsule comprises a friable perfume microcapsule.

5. The method of claim 4, wherein the friable perfume microcapsule comprises a shell wall comprising a material selected from the group consisting of polyethylenes, polyamides, polystyrenes, polyisoprenes, polycarbonates, polyesters, polyacrylates, aminoplasts, and a combination thereof.

6. The method of claim 2, wherein the microcapsule slurry comprises:

(a) less than 75% water, by weight of the microcapsule slurry; and (b) a structurant.

7. The method of claim 6, wherein the microcapsule slurry comprises from 5% to 50% water or from 20% to 75% water, by weight of the microcapsule slurry.

8. The method of claim 6, wherein the structurant comprises a salt, a polymer, or a combination thereof.

9. The method of claim 1, wherein the microcapsule is dispensed in a dry form and the dry form comprises from 0% to 5% of water, by weight of the dry form.

10. The method of claim 9, wherein the dry form comprises from 0% to 3% of water, by weight of the dry form.

11. The method of claim 1, further comprising embossing the precursor non-fibrous laundry detergent sheet before dispensing the microcapsule onto the precursor non-fibrous laundry detergent sheet.

12. A method of making a non-fibrous laundry detergent sheet comprising dispensing a microcapsule onto a precursor non-fibrous laundry detergent sheet, wherein the precursor non-fibrous laundry detergent sheet comprises: (a) at least one surfactant; (b) at least one film former; and wherein said non-fibrous laundry detergent sheet has a thickness ranging from 0.1 mm to 10 mm, wherein the microcapsule is dispensed at a temperature of about ±20° C. of the temperature of the precursor laundry detergent sheet, and wherein the microcapsule is dispensed at a temperature of about 55° C. to about 99° C.

13. The method of claim 12, wherein the microcapsule comprises a friable microcapsule comprising a shell wall and a core material, the core material comprising a perfume composition.

14. The method of claim 13, wherein the friable perfume microcapsule comprises a shell wall comprising a material selected from the group consisting of polyethylenes, polyamides, polystyrenes, polyisoprenes, polycarbonates, polyesters, polyacrylates, aminoplasts, and a combination thereof.

15. The method of claim 12, wherein the microcapsule is dispensed as a microcapsule slurry, the microcapsule slurry comprising:

(a) less than 75% water, by weight of the microcapsule slurry; and (b) a structurant comprising at least one of a salt, a polymer, or a combination thereof.

16. A method of making a non-fibrous laundry detergent sheet comprising dispensing a microcapsule onto a precursor non-fibrous laundry detergent sheet, wherein the precursor non-fibrous laundry detergent sheet comprises: (a) at least one surfactant; (b) at least one film former; and wherein said non-fibrous laundry detergent sheet has a thickness ranging from 0.1 mm to 10 mm, wherein the microcapsule is dispensed at a temperature of about ±10° C. of the temperature of the precursor laundry detergent sheet, and wherein the microcapsule is dispensed at a temperature of about 60° C. to about 98° C.

17. The method of claim 16, wherein the microcapsule comprises a friable microcapsule comprising a shell wall and a core material, the core material comprising a perfume composition.

18. The method of claim 17, wherein the friable perfume microcapsule comprises a shell wall comprising a material selected from the group consisting of polyethylenes, polyamides, polystyrenes, polyisoprenes, polycarbonates, polyesters, polyacrylates, aminoplasts, and a combination thereof.

19. The method of claim 16, wherein the microcapsule is dispensed as a microcapsule slurry, the microcapsule slurry comprising:

(a) less than 75% water, by weight of the microcapsule slurry; and (b) a structurant comprising at least one of a salt, a polymer, or a combination thereof.

* * * * *